Oct. 27, 1970     A. F. NYLANDER     3,536,444
METHOD FOR SEPARATING THE COMPONENTS IN BRINE
Original Filed Feb. 26, 1965     7 Sheets-Sheet 1

INVENTOR.
ALFRED F. NYLANDER
BY
ATTORNEYS

Oct. 27, 1970          A. F. NYLANDER          3,536,444
METHOD FOR SEPARATING THE COMPONENTS IN BRINE
Original Filed Feb. 26, 1965                    7 Sheets-Sheet 3

INVENTOR.
ALFRED F. NYLANDER
BY
ATTORNEYS

FIG_5

Oct. 27, 1970    A. F. NYLANDER    3,536,444

METHOD FOR SEPARATING THE COMPONENTS IN BRINE

Original Filed Feb. 26, 1965

FIG_9

MATERIAL BALANCE IN TONS PER HOUR

| OPERATION | K | Mg | Na | Cl | SO$_4$ | H$_2$O | TOTAL |
|---|---|---|---|---|---|---|---|
| 43 SALT PANS-RAMON BRINE | 20.94 | 100.84 | 288.79 | 704.00 | 74.87 | 3192.01 | 4381.45 |
| RECYCLE FROM CARNALLITE PROCESSING | 1.83 | .40 | 2.02 | 5.85 | .13 | 5.41 | 15.64 |
| LEAKAGE @ 19% OF FEED | 4.19 | 18.85 | 54.01 | 133.76 | 11.47 | 597.00 | 819.28 |
| EVAPORATION | | | | | | 1572.16 | 1572.16 |
| NaCl | | | 199.47 | 307.88 | | | 507.35 |
| ENTRAINED LIQUOR TO 46 | 1.50 | 6.54 | 2.97 | 21.35 | 5.01 | 81.76 | 119.13 |
| 46 PRECARNALLITE PAN LIQUOR | 17.07 | 75.84 | 34.36 | 246.85 | 58.53 | 946.52 | 1379.17 |
| RECYCLE FROM 56 AND PLANT PROCESSING | 12.13 | 210.99 | 11.75 | 595.88 | 67.23 | 1572.56 | 2470.54 |
| EVAPORATION | | | | | | 18.17 | 18.17 |
| NaCl | | | 28.30 | 43.68 | | | 71.98 |
| ENTRAINED LIQUOR TO 48 | .21 | 2.37 | .13 | 6.53 | 1.05 | 20.74 | 31.03 |
| 48 CARNALLITE PANS LIQUOR | 28.99 | 284.46 | 17.69 | 792.52 | 124.70 | 2480.18 | 3728.54 |
| EVAPORATION | | | | | | 403.60 | 403.60 |
| NaCl | | | 7.96 | 12.28 | | | 20.24 |
| CARNALLITE | 21.91 | 13.61 | | 59.67 | | 60.51 | 155.70 |
| ENTRAINED LIQUOR TO 52 | .11 | 3.04 | .06 | 7.99 | 1.45 | 22.54 | 35.19 |
| 52 HYDRATE PANS LIQUOR | 6.98 | 267.81 | 9.66 | 712.58 | 123.25 | 1993.53 | 3113.81 |
| EVAPORATION | | | | | | 237.67 | 237.67 |
| NaCl | | | 3.60 | 5.56 | | | 9.16 |
| CARNALLITE | 5.48 | 3.40 | | 14.92 | | 15.13 | 38.93 |
| PENTAHYDRATE | | 12.68 | | | 50.09 | 46.96 | 109.73 |
| ENTRAINED LIQUOR TO 56 | | 3.00 | .06 | 8.19 | .92 | 20.17 | 32.34 |
| 56 TERMINAL LIQUOR STORAGE | 1.50 | 248.72 | 6.00 | 683.91 | 72.24 | 1673.60 | 2685.97 |
| LIQUOR TO 46 | 1.07 | 183.52 | 4.42 | 504.53 | 53.39 | 1234.66 | 1981.59 |
| LIQUOR RESERVE | .43 | 65.20 | 1.58 | 179.39 | 18.85 | 438.94 | 704.39 |

INVENTOR.
ALFRED F. NYLANDER
BY
*Fehr & Swain*
ATTORNEYS

United States Patent Office 3,536,444
Patented Oct. 27, 1970

3,536,444
METHOD FOR SEPARATING THE COMPONENTS IN BRINE
Alfred F. Nylander, Redwood City, Calif., assignor to Minera Bayovar, S.A., Palo Alto, Calif., a corporation of Delaware
Continuation of application Ser. No. 435,489, Feb. 26, 1965. This application June 13, 1969, Ser. No. 837,005
Int. Cl. C01d 3/00; C01f 5/30, 5/40
U.S. Cl. 23—89                                18 Claims

ABSTRACT OF THE DISCLOSURE

Potassium, in the form of carnallite free of sulfate, is removed from brine by adding $MgCl_2$ to brine just below potassium saturation. Specifically, during solar evaporation, bittern of density about 1.36 is recycled into feed brine near saturation of potassium and having a density less than 1.32 (at 35° C.). Magnesium sulfate hydrates are crystallized from brine to provide a bittern with an improved ratio of magnesium chloride to magnesium sulfate for recycling.

---

This application is a continuation of U.S. application Ser. No. 435,489, filed Feb. 26, 1965, now abandoned.

This invention relates to a method of separating the components in brine. More particularly, the invention relates to recovering potassium-containing salts from marine brine by solar evaporation.

The term "potash" is defined herein as potassium-containing salts. Included are sylvite (KCl), carnallite (KCl·$MgCl_2$·$6H_2O$), kainite (KCl·$MgSO_4$·$3H_2O$), and leonite ($MgSO_4$·$K_2SO_4$·$4H_2O$), among others. Potash has wide utility, particularly in the fertilizer industry. Potash is an essential ingredient in the making of most fertilizers.

Sea water nad marine brines (i.e., brines of marine origin) generally contain a variety of salts. While a large number of anions and cations are present in sea water, only four cations are present in amounts sufficiently large to be commercially important. They are: sodium, potassium, magnesium, and calcium. Of the anions present, only chloride, sulfate, and bromide are present in relatively large amounts. Carbonate, bicarbonate and borates are present in some inland locations in sufficient amounts to be economically important, but generally not in sea water. While sea water has relatively fixed ratios of components throughout the world, inland brines which are derived originally from sea water exist in many areas. These marine brines often are modified as to one or more of the components. For example, in the Dead Sea, only very small amounts of sulfate are present. In the Great Salt Lake in Utah, bromine is absent except in trace amounts. In other locations, calcium is present only in negligible amounts.

The present invention is particularly concerned with a five component system of sodium, potassium, magnesium, sulfate and chloride. That is, calcium and bromide are not present in large amounts. Such a five component system occurs naturally in many locations in the world, particularly in arid regions near oceans. However, the invention is adaptable to sea water and systems containing calcium and bromine, since calcium precipitates from brine at relatively low density, and bromine largely remains in solution until all of the salts with which the present invention are concerned are removed. Calcium crystallizes as calcium carbonate and calcium sulfate before halite (NaCl) saturation is reached. Calcium precipitates at a density of about 1.12, which is much lower than the brine density at which sodium chloride crystallizes (about 1.21 and higher). The remaining ions come out of solution at even higher densities. While calcium is present at saturation in every step of the process of the present invention, the amounts present are so low as to be negligible. For example, in the step where carnallite precipitates, only about 0.02% calcium is present. Similarly, carbonate, bicarbonate and borate ions may be present in the brine without substantially altering the effectiveness of the present invention. Consequently, for ease of discussion, only a five component system is considered herein.

The potassium component of the brines contemplated may be present in any amount above about 0.09 mol per 1000 mols of water. In practice, potassium in naturally occurring brines rarely exceeds 1.7 mols per 1000 mols of water, although some waste liquors from manufacturing operations may be as high as 6 mols or more of potassium per 1000 mols of water. The other four components may vary from about 4 to 50 mols sodium, from about 1 to 30 mols magnesium, from about 5 to 50 mols chloride, and from 0.5 to 14 mols sulfate, all per 1000 mols of water.

In the recovery of potash, past efforts have met with little or no commercial success because of the difficulty of separating potassium values from the sodium, chloride, and sulfate components. In the solar evaporation of marine brines, potassium precipitates as one of at least nine salts or double salts. Of these, carnallite (KCl·$MgCl_2$·$6H_2O$) is of particular importance. When sulfate is present in the solution, kainite (KCl·$MgSO_4$·$3H_2O$) tends to form on solar evaporation to thereby extract considerable amounts of the potassium values in combination with sulfate. Separation of the potassium values from kainite is difficult and expensive.

In the prior art, such as U.S. Pat. No. 1,304,097, expensive equipment was required to carry out high temperature digestion or other steps. However, the requirement for energy producing means and equipment large enough to handle the enormous quantities of water necessary to recover the small amounts of potassium (less than 0.05% of sea water) made prior art methods and apparatuses uneconomical. Solar evaporation alone in open pans without elaborate equipment or processing steps has not been considered an adequate means for recovering potash from brine.

In order to remove sulfate to promote the formation or carnallite in place of kainite, it has been suggested in the past to perform a liming operation. In this technique, lime is added to the sulfate-containing brine to form and deposit crystals of calcium sulfate. However, this technique is not wholly effective and, moreover, demands considerable amounts of lime which may not be readily available at the location of the brine, which often is in a desert area. Consequently, the cost of the liming operations may be prohibitive in separating the components.

As part of the sulfate problem, a considerable portion of the potash values crystallizes with massive amounts of halite (NaCl) in relatively early stages of the solar evaporation. Separation of the potash from the halite is economically unfeasible under previous methods. Generally, the remaining potash values in conventional salt pans used in solar evaporation are not separated, but are discharged to waste in the salt pan bitterns.

It is an object of the present invention to provide a novel method to separate the components contained in marine brines.

Another object of this invention is to provide a novel method for deriving potash from marine brines without expensive equipment or substantial consumption of nonsolar energy.

Another object of this invention is to provide a novel method for the recovery of potassium from aqueous solutions or brines containing potassium in combination with magnesium, chloride and sulfate, which is inexpensive, simple, and demands a minimum of material handling.

Another object of this invention is to provide a method for the recovery of potash from marine brine without the addition of expensive reagents in great quantities.

It is also an object of this invention to provide novel apparatus for carrying out certain steps of the method.

Additional objects of the invention will appear from the following description in which the preferred embodiments of the invention have been set forth in detail in conjunction with the accompanying drawings:

FIG. 3 is a graph illustrating the relationship of potassium, sodium, and sulfate to magnesium chloride in a typical naturally occurring brine when solar evaporated.

FIG. 4 is a graph illustrating the relationship of potassium, sodium and sulfate to magnesium chloride in evaporation of sea water.

FIG. 6 is a graph illustrating the relationship of potassium and sulfate to magnesium chloride using recycle of bittern in a terrestrial brine system.

FIG. 7 is a graph illustrating the relationship of potassium and sulfate to magnesium chloride using recycle of bittern in sea water.

FIG. 9 is a typical material balance sheet.

Figure 1:
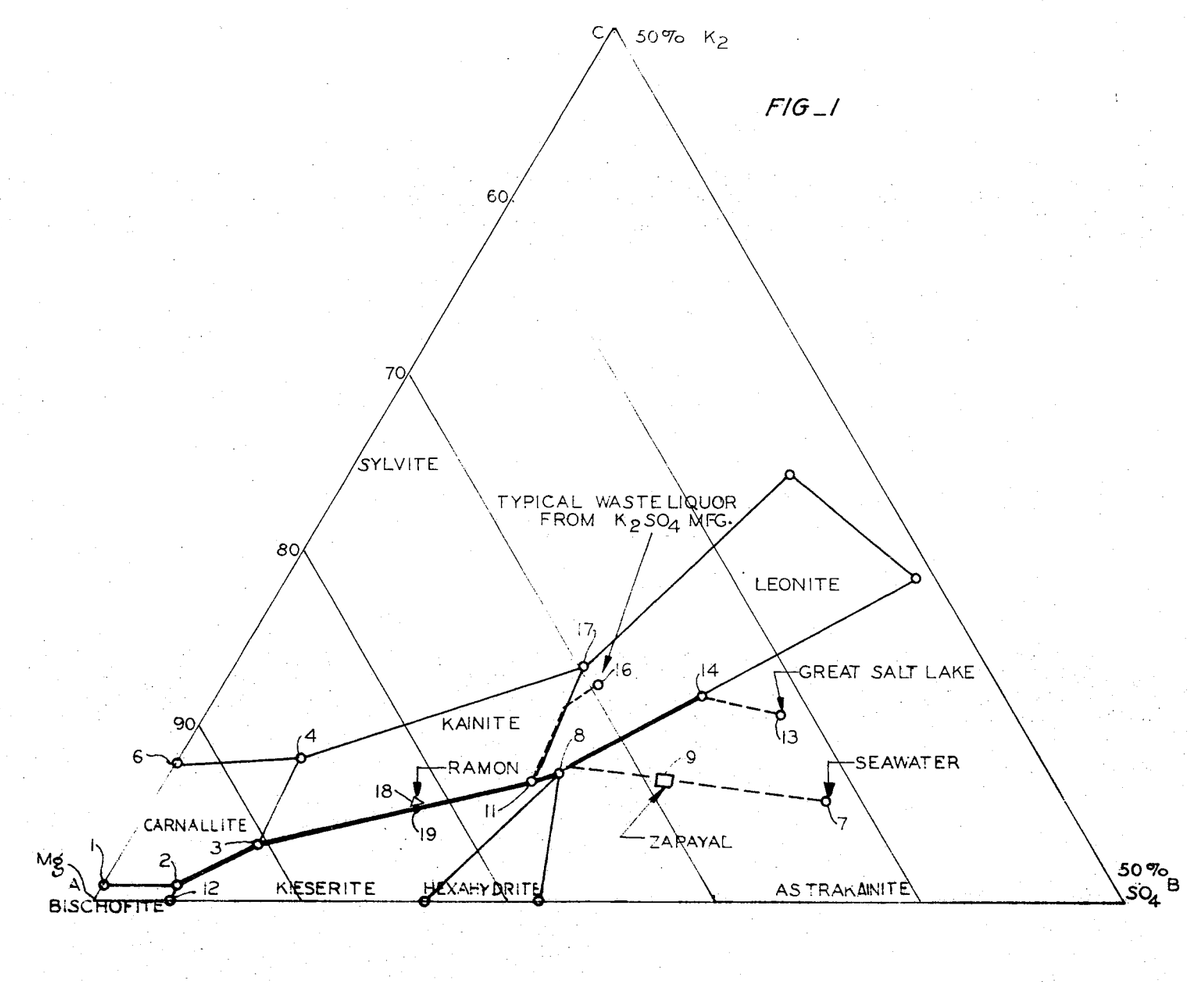
FIG. 1 is a triangular coordinate graph illustrating the equilibrium relationship between magnesium, potassium, and sulfate in various marine brines throughout the world.

The present invention is predicated on the principles illustrated in FIG. 1. In this graph, point A represents 100-mole percent magnesium; point B 50-mole percent sulfate; and point C 50-mole percent potassium in an aqueous brine. The data for this graph were obtained from information published in Die Losungsgleichgewichte der Systeme der Salze Oceanischer Salzablagerungen, By J. D'Ans. The data were collected at a temperature of 32.5° C. and represents the true equilibria. Where different temperatures are used, the phase relationships will vary. Similarly, where true equilibrium conditions are not attained, the phase relationships will differ from that illustrated in FIG. 1.

It will be noted that carnallite tends to form in the area bounded by points 1, 2, 3, 4, and 6. Therefore, if a brine solution has less than 86-mole percent magnesium, carnallite will not form. Rather, kainite or other potassium containing salts will crystallize. In order to form carnallite, a solution low in sulfate and high in magnesium is necessary.

Formation of carnallite is desirable because of the ease of deriving commercial products from carnallite. Well known techniques are available to obtain high quality muriate of potash from a mixture of halite and carnalite. When salts other than halite are mixed with carnallite, on the other hand, separation is difficult. For example, a mixture of halite, carnallite and magnesium sulfate treated in plants in Stassfurt, Germany, was separated only by a series of hot solution and crystallization stages.

Point 7 of FIG. 1 illustrates the composition of sea water. Upon solar evaporation, the composition of sea water follows the lines between 7 and 8. Point 9 is a composition of sea water that has been subjected to solar evaporation to a density of 1.18. Such concentrated sea water exists in Zapayal, Peru, and has composition about the same as that of point 9 of FIG. 1. After sea water reaches the phase line between leonite and astrakainite ($MgSO_4 \cdot Na_2SO_4 \cdot 4H_2O$) at point 8, the composition changes in accordance with the line between points 8 and 11 on solar evaporation. That is, kieserite and leonite are in equilibrium. At point 11, kainite begins to form and the composition of sea water follows the path between points 11 and 3. At point 3, carnallite begins to form and equilibrium between kieserite and carnallite is attained. At point 2, gischofite ($MgCl_2 \cdot 6H_2O$) is formed.

Point 13 represents the composition of brine in the Great Salt Lake, in Utah. On solar evaporation of this water, the composition changes along the line between points 13 and 14. At point 14, the interface between leonite and astrakainite is reached and the composition changes along the line between points 14 and 8. From point 8 on the ultimate bittern, the composition of brine from the Great Salt Lake changes in the same manner as sea water or other brines on solar evaporation.

Point 16 represents a typical waste liquor containing $K_2SO_4$ from a manufacturing operation. On evaporation, the waste liquor changes in composition along the line between points 16 and 17. At point 17, kainite begins to form and the composition may be adjusted to change along the line between points 17 and 11. At point 11, until the final evaporation is completed, the composition changes in the same manner as water from sea water or the Great Salt Lake.

Point 18 of FIG. 1 represents the composition of a typical brine existing in the Sechura Desert region of Peru and is designated "Ramon" brine. This brine is typical of those naturally occurring in various areas throughout the world. On solar evaporation, Ramon brine changes in composition until the composition of point 19 is reached. From point 19 until point 12, the composition changes in the same manner as the brines above discussed.

It will therefore be seen from FIG. 1 that no matter what the source of the brine is, its composition changes in accordance with established principles until the ultimate brine is reached.

As noted above, FIG. 1 relates to theoretical data representing true equilibrium conditions. In accordance with the present invention, however, carnallite may be crystallized from compositions far outside the limited area bounded by points 1, 2, 3, 4, and 6 of FIG. 1.

Figure 2:
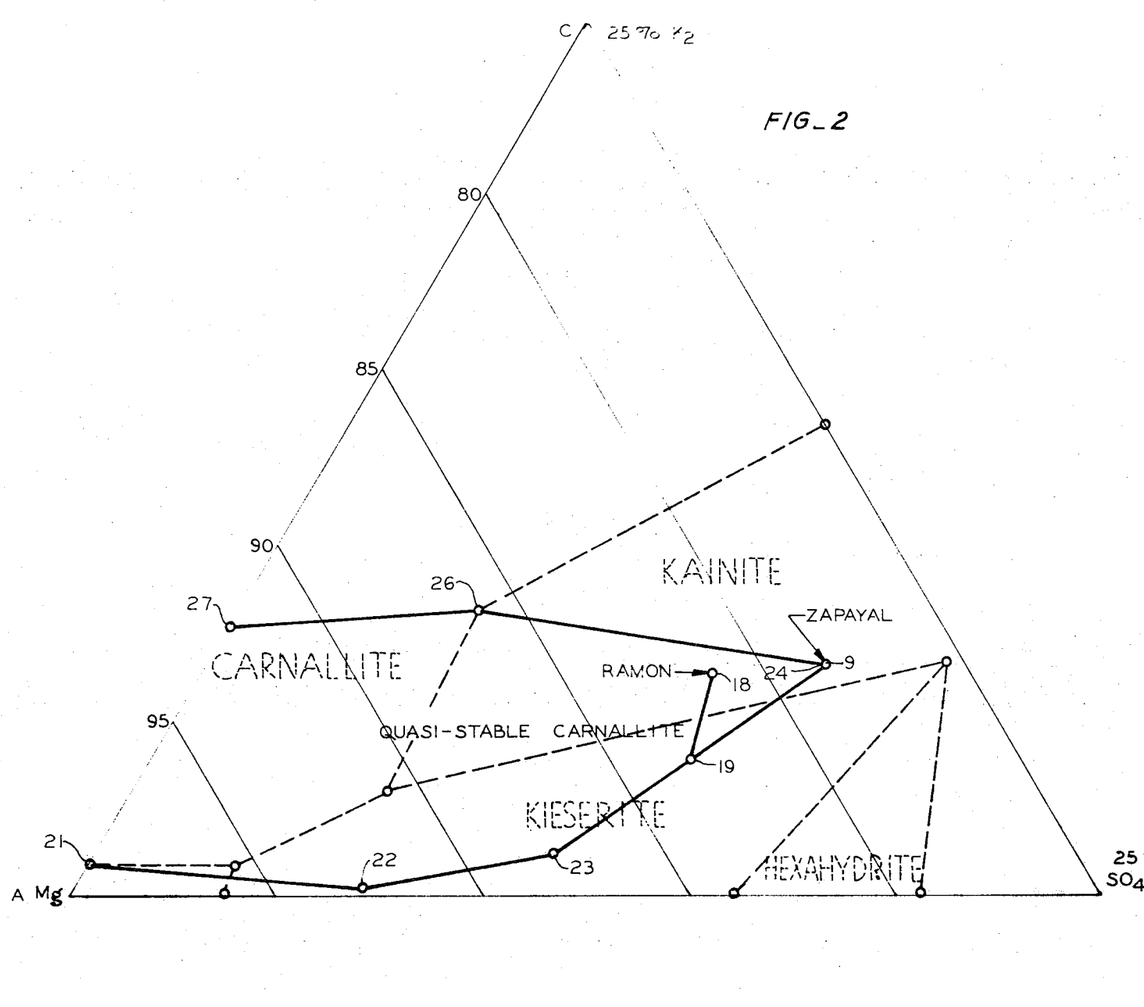
FIG. 2 is a triangular coordinate graph illustrating the relationship between magnesium, potassium, and sulfate from actual experimental results in solar evaporation.

Referring to FIG. 2, point A again represents 100% magnesium. However, point B represents 25% $SO_4$ and point C represents 25% $K_2$. Thus, the area in the left corner of FIG. 1 has been expanded. Shown in dotted lines in FIG. 2 are the phase relationships described above with respect to FIG. 1. Also shown in FIG. 2 is the area where carnallite formation takes place according to the present invention. The data for this graph was collected at 32° C. in Bayovar, Peru. I have found that the phases indicated are generally applicable to temperatures between about 20 and 50° C., although variations will occur with changes in temperature and as equilibria are reached.

I have found that compositions within the area bounded by points 21, 22, 23, 24, 26 and 7 form crystals of carnallite. These crystals have the same composition as crystals within the area bounded by points 1, 2, 3, 4, and 6 of FIG. 1. To distinguish them from the crystals obtained by crystallization from a solution in equilibrium, I call the crystals in the area bounded by points 21, 22, 23, 24, 26, and 27 of FIG. 2 "quasistable carnallite," because the crystals are apparently stable but are derived under nonequilibrium conditions. Thus, by carefully controlling the conditions under which crystallization takes place, carnallite crystals are formed even though the brine is within the area at which kainite or kieserite should form.

While I do not wish to be bound to any particular theory, it appears that the reason for forming quasi-stable carnallite is that crystals containing sulfate form very slowly while crystals containing sodium or potassium crystallize rapidly. Chloride-containing crystals including KCl form much faster, often hundreds of times faster, than sulfate-containing salts, so that the solution remains supersaturated as to sulfate while quasi-table carnallite is deposited as crystals.

As shown in FIG. 2, a brine containing above about 78 mole percent magnesium may form quasi-stable carnallite, as compared to a composition having about 86 mole percent Mg under the equilibrium conditions indicated in FIG. 1.

According to the present invention, a composition high in magnesium and low in sulfate is recycled to combine with a solution relatively low in magnesium and higher in sulfate with the result that carnallite ($KCl \cdot MgCl_2 \cdot 6H_2O$) is formed as the first potash phase. The composition which is the ultimate brine from evaporation, or it may be a slurry of solid crystals of bischofite in brine. Moreover, solid bischofite may be used as the recycle. Any composition high in magnesium chloride is suitable, but a recycle of the bittern or bischofite derived from solar evaporation is particularly economical.

By crystallizing carnallite instead of kainite ($KCl \cdot MgSO_4 \cdot 3H_2O$)

the sulfate remains in solution while the potassium is withdrawn in crystalline form suitable for the manufacture of potassium chloride. Similarly, the formation of kieserite ($MgSO_4 \cdot H_2O$) or other magnesium sulfate hydrates should be avoided in the carnallite area because of the difficulty in separating carnallite from the magnesium sulfate hydrates without repeated digestion at high temperatures and recrystallization steps.

On the other hand, the crystallization of halite (NaCl) with the carnallite is not of much consequence. Carnallite when decomposed with water converts to sylvite which is readily separated from halite by flotation. In my method, brine is maintained without the quasi-stable carnallite field shown in FIG. 2 so that the sulfate remains in solution until from 30 to 90% of the potash values have been removed as well as most of the NaCl.

Turning to FIG. 3, this graph illustrates the relationship between components in the solar evaporation of brine from the Ramon region in the Sechura Desert, Bayovar, Peru. Potassium, sulfates and sodium are shown in mols per 1000 mols of water. Actually, the amounts of each of the 5 components in the brine system may be determined from FIG. 3 by expressing univalent ions as double equivalents, i.e., $Na_2$, $K_2$ and $Cl_2$. Thus, the total mols of chloride is the sum of the mols of $MgCl_2$ from the ordinate and the mols of $Na_2$ and $K_2$ from the abscissa. In a similar fashion, the total mols of magnesium may be determined by adding the mols of $MgCl_2$ from the ordinate and the mols of $SO_4$ from the abscissa.

FIG. 3 illustrates that as the mols per thousand of magnesium chloride increase, greater amounts of potassium (Curve $K_2$) remain in solution up to the point at which carnallite begins to form. At that point (about 67 mols per thousand magnesium chloride) about six mols per thousand potassium remain in solution. At increased amounts of $MgCl_2$, carnallite forms with the result that less and less potassium remains in solution. That is, carnallite, as well as halite, crystallizes removing the potassium and sodium from the brine.

In contrast, Curve $SO_4$ of FIG. 3 illustrates the amount of sulfate which remains in solution. A much greater amount of sulfate than potassium remains in solution at the concentrations of magnesium chloride at which carnallite is crystallized.

Curve $Na_2$ of FIG. 3 illustrates the solubility of sodium in the five component system. At low concentrations of $MgCl_2$, massive amounts of salt are crystallized. At higher concentrations, only small amounts of sodium chloride are present, even though the solution is generally saturated in $Na_2$.

Consequently, by maintaining a sulfate concentration in the area between the $SO_4$ saturation curve and the ordinate, and above about 70 mols per thousand of magnesium chloride, between about 30 to 90% of the potassium will crystallize as carnallite while leaving sulfate in solution for further processing. At low concentrations of magnesium chloride (below about 60 mols per thousand), halite (NaCl) may be crystallized and removed while maintaining both potassium and sulfate in solution.

Referring to FIG. 4, this graph is similar to FIG. 3 in that it shows the relationship of $K_2$, $SO_4$ and $NA_2$ to $MgCl_2$. This graph illustrates the quasi-stable equilibria in the solar evaporation of sea water which has been obtained from the concentrated source at the Zapayal region of Bayovar, Peru. As in FIG. 3, FIG. 4 shows that the $K_2$ curve breaks sharply at about 67 mols per thousand, which is the point at which carnallite begins to form.

A significant difference between FIGS. 3 and 4 is the fact that the $K_2$ line is sloped in FIG. 4 below about 67 mols per thousand, whereas it is straight in FIG. 3. The straight line of FIG. 3 indicates that no potassium crystallizes from the solution prior to the formation of carnallite at about 67 mols per thousand $MgCl_2$. If potassium had crystallized, then the line between points 31 and 32 would slope towards the ordinate. If magnesium had crystallized but potassium had not, then the line would slope towards the abscissa. Similarly, FIG. 3 shows that sulfate does not crystallize because of the same straight line function until about 75 mols of $MgCl_2$. Consequently, only halite is formed in the early stages of evaporation. Between about 67 mols $MgCl_2$ and about 75 mols $SO_4$, $K_2$ crystallizes while $SO_4$ does not. This indicates that carnallite is formed prior to the formation of $MgSO_4$ salts which crystallize the sulfate components.

FIG. 4, in contrast to FIG. 3, shows the slope of both $K_2$ and the $SO_4$ curves towards the ordinate. This illustrates the fact that $SO_4$ is crystallizing in FIG. 4 in the early stages as gypsum ($CaSO_4 \cdot 2H_2O$) and as anhydrite ($CaSO_4$) up until about 35 mols of $MgCl_2$. At that point, the $K_2$ curve slopes toward the ordinate showing that potassium is forming a solid phase salt. Referring to FIG. 1, my calculations indicate that the composition is at a juncture between the leonite and kainite fields, so that the solid phase salts are leonite ($MgSO_4 \cdot K_2SO_4 \cdot 4H_2O$)

and kainite ($KCl \cdot MgSO_4 \cdot 3H_2O$).

The dotted line in FIG. 4 shows the imaginary straight line function of the $K_2$ curve which is extended from the straight line portion of from zero to 35 mols of $K_2$. That is, if the straight line portion of curve $K_2$ were extended, it would follow the dotted line. In fact, the curve slopes towards the ordinate because of the precipitation of potassium prior to the point at which carnallite is formed. The amount of potassium which is crystallized prior to the formation of carnallite is equal to the difference between 9.0 and 5.5 (between points 33 and 34), or about 38% of the total potassium in the feed. Furthermore, the remaining $K_2$ which crystallizes above about 67 mols is grossly contaminated and is not amenable to economic recovery because of the presence of sulfate salts.

Figure 5:
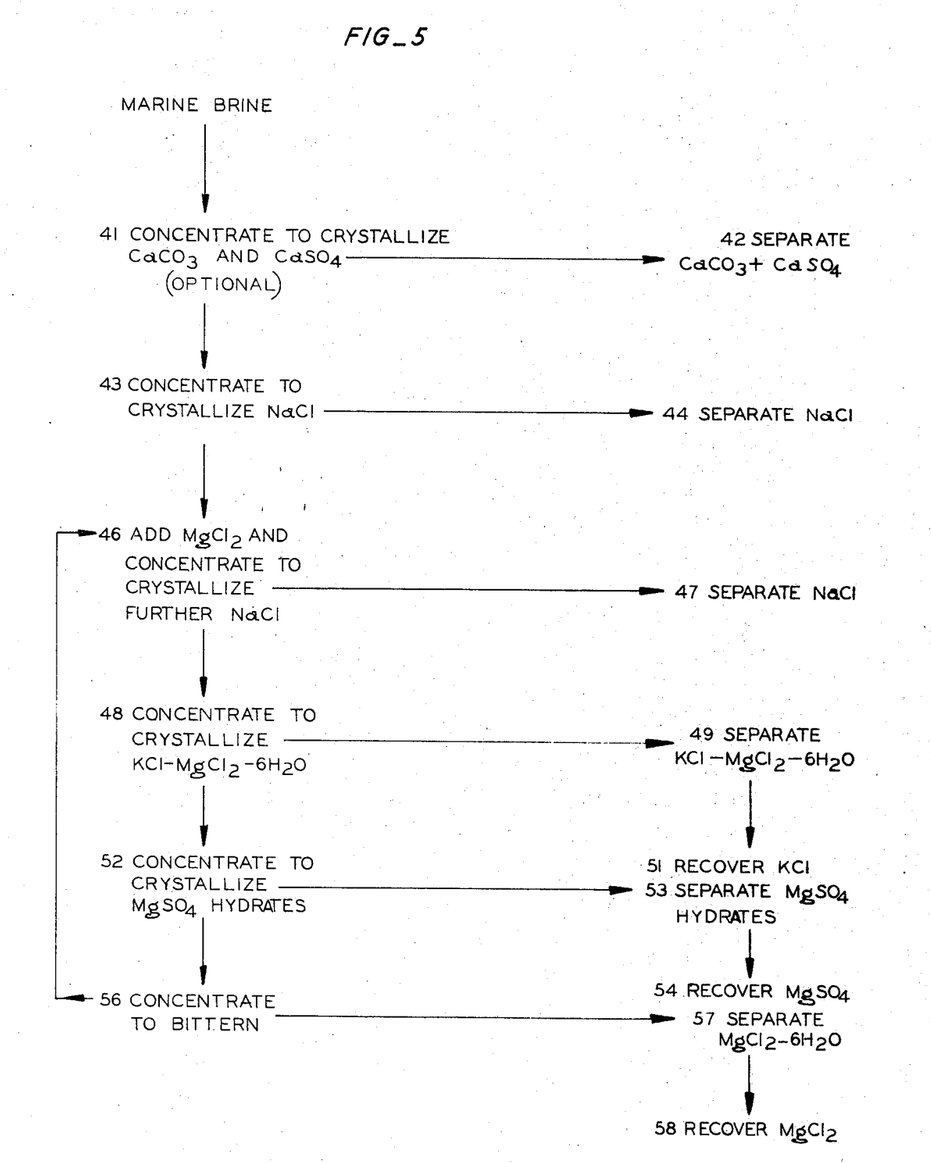
FIG. 5 is a flowsheet illustrating the process of the present invention.

Referring to FIG. 5, the method can be carried out as follows: In step 41, marine brine is introduced into solar pans where evaporation takes place to cause crystallization of calcium salts. Generally, concentration to a density between 1.18 and 1.21 is necessary. In this application, density measurements are taken at about 35° C. Step 41 is optional to the extent that inland brines often are already concentrated to a density at which calcium is no longer present in any substantial amounts so that significant quantities of calcium salts do not form. Where sea water is introduced into the solar pans, step 41 crystallizes the calcium salts. In step 42, the calcium salts are separated to form gypsum, lime, or other calcium products. Step 42 is also optional and is not carried out where the calcium salts are not present.

In step 43, the liquor from step 41 (or the marine brine if no calcium salts are present) is subjected to further solar evaporation to cause crystallization of sodium chloride. Generally, feed concentration to a density between 1.18 and 1.21 is needed to initiate halite crystallization. Halite (NaCl) crystallizes at a density between 1.18 and about 1.25. Between about 1.25 and 1.36, halite is impure. As will be noted hereinafter, a substantial amount of NaCl is crystallized in step 43, generally about 90%. This salt is removed in step 44 to a separate area. After the major part of the sodium chloride has been removed, the remaining solution from step 43 is transferred to a second group of solar pans called "precarnallite" pans, where step 46 is performed.

In step 46, the concentration of the brine is increased to a density between 1.25 and 1.33, with the result that further halite is crystallized. In addition to the crystallization of halite resulting from evaporation, further halite is precipitated by the addition of magnesium chloride solution in step 46. Referring to FIGS. 3 and 4, it will be observed that the solubility of $Na_2$ drops drastically as the concentration of $MgCl_2$ is increased. Therefore, the addition of magnesium chloride in step 46 serves to immediately "salt out" halite in substantial amounts. By adding the $MgCl_2$ in step 46 at a point before the concentration of the brine reaches the stage at which carnallite forms, most of the halite can be removed prior to the separation of carnallite. The crystals of halite are separated in step 47 by either discharging to waste or to salt storage for further refining.

The $MgCl_2$ which is added at step 46 is recycled from the terminal portions of the process. The recycle may be either the solar pan bittern or a slurry of bittern plus bischofite crystals or even solid bischofite crystals may be recycled. I contemplate also that $MgCl_2$ which has been separated from the bound water of bischofite may be employed. At any rate, the recycle in either liquid or solid form will have a composition in mole percent such that a synthetic brine is formed which intercepts the quasi-stable carnallite field of FIG. 2. The higher the ratio of magnesium or of magnesium plus potassium to sulfate in the recycle, the less the recycle that is required for a given result. Where high quality bischofite is recycled, only small amounts are needed to precipitate carnallite from the brine. However, it is not economical to produce pure bischofite for recycling and the ratio of Mg plus K to $SO_4$ in the recycle is kept as low as is consistent with the desired grade and recovery for economic reasons. Generally, the recycle is in equilibrium with bischofite and in high concentration. The recycle serves to raise the concentration of $MgCl_2$ so that on further evaporation in subsequent steps, carnallite crystallizes as the first potash phase. In other words, the recycle maintains the $SO_4$ composition of the brine between the $SO_4$ saturation curve in FIG. 4 and the ordinate, thus preventing premature crystallization and loss of K in an undesirable form such as kainite or leonite.

The mixture of solutions in the precarnallite pans of step 46 is transferred to carnallite pans in step 48 where the mixture is subjected to further solar evaporation. The mixture of a first solution high in magnesium chloride with a second solution from step 43 (which is relatively low in NaCl) provides a solution saturated as to potassium but unsaturated as to sulfate. Since the magnesium content is high because of the recycled bittern, the composition falls within the area bounded by 21, 22, 23, 24, 26 and 27 of FIG. 2. On concentration to a density between 1.31 and 1.35 in step 48, crystallization of carnallite occurs.

In order to form quasi-stable carnallite, rapid processing takes place, rather than waiting for the equilibria to be reached. Because the sulfate is so slow to crystallize, this component remains in supersaturation during the crystallization of carnallite. If sufficient time passes, the quasi-stable carnallite of FIG. 2 will gradually change to the equilibrium conditions outlined in FIG. 1. As noted above, potassium crystallizes much faster than sulfate. To take advantage of this difference in crystallization rates, the depth in the pan is controlled so that it is as low as practicable. The depth of the brine in the solar evaporation pan should not exceed about 50 centimeters.

Another factor of importance in forming quasi-stable carnallite is to separate the carnallite crystals from the liquor before equilibrium is reached. The evaporation rate must be rapid and materially greater than the rainfall during the season in which the process is carried out. Generally, about 3 to 10 inches per month of evaporation in excess of rainfall is desirable. In some locations, the effects of wind and sand nucleation bear on the formation of quasi-stable carnallite.

In step 49, the crystals of carnallite are separated from the liquor remaining in step 48 and further processed to recover marketable potash in step 51. Potash recovery in step 51 is conveniently carried out by decomposing carnallite to produce KCl which is subjected to flotation to recover the KCl. The tails, containing NaCl and small amounts of potassium, are recycled to any of the pans containing brine unsaturated as to potassium. For example, the flotation tailings may be recycled to the precarnallite pans where step 46 is performed. Thus, the remainder of the potassium is redissolved, thereby improving process recovery. Also, additional halite is recovered in crystalline form.

The liquor from step 48 is transferred to a separate area where it is subjected to still further solar evaporation to concentrate it in step 52 to a density between 1.33 and 1.36 but preferably between 1.358 and 1.362 to crystallize magnesium sulfate hydrates. The magnesium sulfate hydrates that are formed have between 1 and 7 mols water of crystallization. In order to distinguish these $MgSO_4$ hydrates from those having higher amounts of bound water, the term "hydrite" is sometimes used in the present specification. In either event, the terms $MgSO_4$ hydrate and hydrite are intended to refer to $MgSO_4$ having 1 to 7 mols water of crystallization. These hydrate crystals are separated in step 53 and, if desired, subjected to further processing to recover magnesium sulfate in step 54 as a marketable salt. In the alternative, the hydrate crystals may be converted to $K_2SO_4$ by the double decomposition of the hydrate crystals first to leonite ($MgSO_4 \cdot K_2SO_4 \cdot 4H_2O$) and then to arcanite ($K_2SO_4$).

The liquor remaining after the removal of the magnesium sulfate hydrate is transferred to bischofite pans in step 56, where final solar evaporation produces the ultimate brine or invariant bittern. The bittern at the terminal point 22 (see FIG. 2) does not change at constant temperature as it is evaporated to dryness, insofar as the five components of the present system are concerned. The bittern contains the five components of the present system in only four salts: bischofite, kieserite, carnallite and halite. In practice, bromine and trace amounts of other elements may affect the composition in the final stages of evaporation to dryness.

A portion of this final and invariant bittern, which is high in magnesium chloride, is recycled to pre-carnallite pans in step 46 to control the concentration below sulfate saturation. The remainder goes to step 57 for further processing to recover magnesium chloride in step 58, and, if desired, bromine and trace elements.

The recycled bittern serves to maintain the sulfate in solution while the potassium is recovered as carnallite. In effect, the recycled bittern acts as a solvent for sulfate, and may be recycled over and over since there is no loss of the five components which are in the bitterns, other than leakage.

Depending upon evaporation rates, concentration, and depth of brine in the particular location in which the process is employed, the entire process in the carnallite-hydrate finishing area may be carried out in up to 30 days. As an example, in the Bayovar region of northern Peru, where evaporation exceeds rainfall by more than 100 inches per year, steps 48 and 52 have been completed in about 18 days. Concentration of sea water to a density of 1.21, on the other hand, may take upwards of 3 to 4 years, depending on conditions.

FIG. 6 illustrates the effect obtained by recycling bittern. This figure illustrates the relationship of $K_2$ and $SO_4$ to $MgCl_2$ in the recycle process carried on with Ramon brine in Peru. When a recycle containing 103 mols $MgCl_2$, less than one mol $K_2$ and about 8 mols $SO_4$ (line A on FIG. 6) is added to a feed brine which has been concentrated to the point where carnallite begins to form, i.e., about 67 mols $MgCl_2$ as shown in line B of FIG. 6 in a ratio of 1 to 1, a resulting composition illustrated by line C is formed. At the point of recycling, carnallite has not yet begun to form in the feed brine. The addition of bittern causes an immediate salting out of carnallite, with the result that the concentration of $K_2$ follows line 61-62. By forming carnallite, the $MgCl_2$ content of the solution is reduced as well as the $K_2$ content. The relative amount of sulfate, on the other hand, increases along line 63-64 since the sulfate present is less than saturation. The line 61-62 represents supersaturation as to potassium with the result that carnallite crystals of high quality are formed. When point 62 is reached (at about 81 mols $MgCl_2$), carnallite continues to precipitate along the saturattion line of $K_2$. During this portion of the concentration about 10-20% of the $K_2$ crystallizes. Sulfate, on the other hand, proceeds along line 64-66 on solar evaporation until the sulfate saturation curve is reached at point 66. At this point, step 52 (FIG. 5) is carried out to remove the $MgSO_4$ hydrates. Primarily, pentahydrate is formed on solar evaporation beyond point 66. Prior to that time, most $K_2$ values have been removed as carnallite while $SO_4$ has remained in solution.

FIG. 7 is similar to FIG. 6 in that it concerns recycling of bittern according to the present invention and shows the relationship of $K_2$ and $SO_4$ to $MgCl_2$. This figure illustrates the results of mixing bittern with sea water and the mixing was carried out using Zapayal brine which was sealed off from communication with the sea in 1962, and has become concentrated to a density of about 1.21.

As with FIG. 6, the recycle in FIG. 7 is at high concentration of $MgCl_2$ at point 71 for $K_2$ which corresponds to point 73 for $SO_4$. When the feed brine is at a concentration just below that at which formation of carnallite occurs, i.e., points 72-74, the mixture in 1 to 1 ratio produces a solution saturated as to $K_2$ and unsaturated as to $SO_4$. The result is that a portion of the carnallite is crystallized while $SO_4$ remains in solution. However, the yield of potassium is low because a considerable amount is deposited before point 72 is reached.

As noted above, the $K_2$ curve for sea water does not maintain a straight line function between the zero point and point 72 but rather slopes toward the ordinate. This slope illustrates that considerable $K_2$ values are being crystallized before formation of carnallite. To prevent this loss of $K_2$, the recycle is preferably added to a feed brine at a very low concentration of $MgCl_2$.

For example, points 76 and 78 represent a feed brine of only 15 mols $MgCl_2$ per 1000 mols of water. At this point, no $K_2$ has been lost in undesirable crystallization of leonite, kainite, etc. Only halite and calcium salts have been deposited. When this feed brine is mixed with bittern or other source of high concentration of $MgCl_2$ in a ratio of 1 volume feed brine to 1.3 volumes bittern, a synthetic brine of composition 79-81 is formed. Halite is salted out of solution while $K_2$ and $SO_4$ remain in solution. On further solar evaporation, $K_2$ concentration follows the line 79-82 until the saturation point of $K_2$ is reached. At that point, solid carnallite forms. Until point 82 is reached, $K_2$ is in solution as well as $SO_4$. However, on reaching point 82, carnallite forms while $SO_4$ remains in solution until an $MgCl_2$ concentration of about 91 mols per 1000 is reached, at which point (83) the solution is saturated as to $SO_4$. Thus, carnallite may be recovered in the concentration between 81 and 91 mols $MgCl_2$. In this manner, loss of the $K_2$ values as leonite, kainite, or other potash salt which forms prior to 67 mols $MgCl_2$ is prevented. The yield of carnallite, mixed with halite, obtained between 81 and 91 mols $MgCl_2$ is between 35 and 60%. This may be recovered as high grade potash. The remaining $K_2$ is not lost, but rather is recovered in the processing of $MgSO_4$ hydrates and bischofite and is recycled along with the bittern at a later point. Solid pentahydrate is deposited when $SO_4$ reaches saturation at point 83.

Recycle in a ratio greater than 1.0 may be employed, but the incremental yield of carnallite is not great enough to compensate for the added cost. But for the added cost, a much greater ratio of recycle to feed brine is highly satisfactory. Ratios up to 3.0 have been used with good results.

The recycle method of the present invention provides flexibility and an opportunity to recover substantially all of the $K_2$ in a form which is readily separable from other components.

A further effect of recycle treatment of a feed brine of relatively low concentration $MgCl_2$, as in point 76, 78 of FIG. 7, is that the mixture of solutions becomes supersaturated as to halite immediately. Referring to FIG. 4, it will be noted that the $Na_2$ curve slopes steeply towards the ordinate from about 20 mols $MgCl_2$ per thousand mols $H_2O$. When the bittern having about five mols Na per thousand mols $H_2O$ is combined with a feed brine having about 40 mols $Na_2$, it will be apparent from FIG. 4 that massive amounts of halite will be precipitated before a concentration of 67 mols $MgCl_2$ per thousand mols $H_2O$ is reached. This has the effect of producing relatively pure halite as well as removing substantial quantities of $Na_2$ prior to the precipitation of carnallite.

Figure 8:
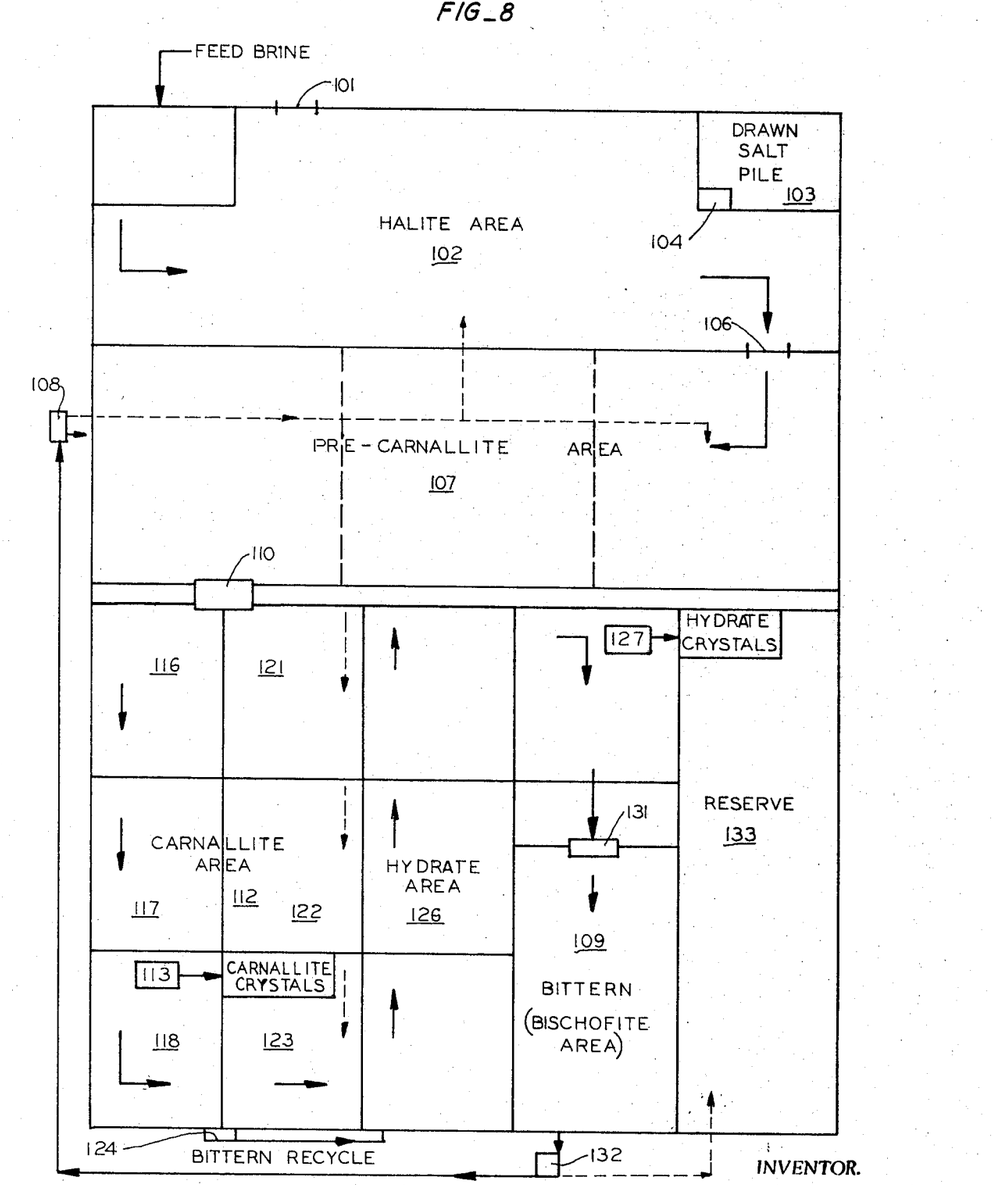
FIG. 8 illustrates the apparatus which is particularly adapted to carry out the present method.

FIG. 8 schematically illustrates apparatus which is particularly adapted to carry out the above described method. While evaporation of water from brine by solar evaporation in open earth pans or ponds is discussed herein as a specific apparatus that has been used for carrying out the separation of water from brine, other equipment may be employed. Thus, a triple effect evaporator is a mechanical means long used to separate water from marine brines. Also, submerged combustion equipment is contemplated, whereby combustible gas is burned under a layer of water so that heat transfers directly from rising bubbles to the water. In addition, refrigeration may be employed to separate water from brine. My method is also adapted to work in conjunction with the various desalination programs. As noted above, all that is required is a brine having the five components mentioned which will in theory follow the path illustrated in FIG. 1.

As to the solar evaporation means of FIG. 8, a series of large evaporating ponds separated by dikes or levees keeps the brine separated in the different stages. The soil under the pans preferably should be impervious or have a low permeability and is, if necessary, compacted or otherwise treated to a density such that leakage is kept to a minimum. Each pan is equipped with gates for intake and outlet of brine when desired and supplemented as necessary by pumps and other devices for elevating and moving brine.

The size of the pans is made as small as practicable without having extremely high dike costs. Smaller pans serve to prevent wind action from whipping up large waves which could wash over the dikes to contaminate adjacent pans. Also, smaller pans permit taking only a limited area out of production for harvesting while the brines in the remaining pans are still being concentrated. An added benefit from using pans as small as practicable is to allow good mixing of the brine in each pan, without short-circuiting the recycled bittern before it has reached remote corners of the particular pan. In short, smaller pans provide versatility not available with large pans.

Incoming brine is transferred through means 101 into pans 102 where step 43 is carried out. After solar evaporation, the liquor is drained and the crystallized salt (chiefly NaCl) is removed from the salt area pans 102 and delivered to the salt pile 103. The means 104 for removing salt to a pile 103 may include any conventional salt recovery equipment. For example, a machine having a scraper and a conveyor belt for transporting salt to a load vehicle may be used. A machine known in the art as a Hancock Scraper is satisfactory. Also, the actual conveying of the salt may be by manpower using hand tools.

Suitable means 106 is provided to transfer the solution from which salt has been removed into the precarnallite pans 107 in which step 46 is carried out. Pans 107 include a sufficient number of pans to permit control of density and the point where recycle is added. As shown in dotted lines, precarnallite area 107 may include 3 connected pans. Means 106 may simply be a gate if pans 102 and 107 are adjacent. If they are not adjacent, a canal is provided in which to transport the brine. Means 106 may include a pump where necessary.

Transfer means 108 serves to transfer bittern from bischofite pans 109 through conduit 111 into precarnallite area 107. The incoming recycled bittern from bischofite pan 109 may be mixed with brine from pans 102 at various points in the precarnallite pans 107 or, as shown, near the gate between precarnallite area 107 and carnallite pans 112. The addition of bittern causes an immediate salting out of halite. If bittern is mixed with brine from pan 102 near the gate 106 between pans 102 and 107, the halite is crystallized in large amounts at a substantial distance from the gate 110 to carnallite area 112. This results in small crystals which may be discharged to waste without contaminating carnallite area 112. On the other hand, if halite is to be recovered and refined for sale, larger halite crystals tend to form if the bittern is mixed just before the brine is transferred to carnallite area 112.

R cycled bittern may also be added at carnallite area 112 if no danger of premature K losses exists as, for example, with Ramon brine. In this instance, the addition of bittern to the feed brine causes an immediate salting out of a carnallite-halite mixture. The particular point at which recycle is added should be not later than the first point at which $K_2$ begins to crystallize, so that the highest possible recovery of $K_2$ may be obtained in the finishing areas (carnallite and hydrates).

In the carnallite area 112, step 48 of the process is carried out in order to form crystals of carnallite. The crystals of carnallite which are deposited in area 112 may be harvested by any suitable means 113 after the liquor has been removed from the particular pan. Means 113 may be a conventional harvesting machine, such as a Hancock Scraper.

Carnallite area 112 for carrying out step 48 of the process is divided into several pans. As a specific example, FIG. 8 shows carnallite area 112 divided into two trains made up of sequentially connected pans. Each train is divided into separate pans, each with gates in order to permit a single pan to be taken out of production at any given time while brine can still flow around the pan which is being harvested or repaired. Preferably, at least two trains are used so that one may be taken out of production for harvesting while the remaining train or trains are still concentrating the brine. In this manner, the present apparatus is adapted for continuous operation or, if preferred, a batch process.

In one of the two trains illustrated in FIG. 8, brine from precarnallite area 107 is introduced into pan 116. The crystals recovered in pan 116 contain relatively large amounts of halite (NaCl) in addition to carnallite. From pan 116, the brine is passed to pan 117 and then to pan 118. In each of these pans the concentration of the solution is increased because of solar evaporation and the proportion of carnallite to halite in the recovered crystals is greater. The solution may continue through many more pans than the three shown as exemplary in FIG. 8 to final carnallite area pan 118, from which a solution high in sulfate content but low in potassium content may be recovered.

In an alternative train through the carnallite area 112, pans 121, 122 and 123 are sequentially connected to provide a train usable when any pan or pans of the earlier described train is out of production. The liquor having substantial amounts of carnallite and halite removed is passed from either final carnallite pan 118 or 123 through transfer means 124 into hydrate area 126 in which step 52 is carried out.

A large number of relatively small pans in the finishing areas aid in control of the process and permits the formation of high quality carnallite from the quasistable solution in one area and high grade crystals of hydrate and bischofite in other areas. Large pans tend to permit equilibrium conditions to be reached because of the relatively greater dwell time per pan, other things being equal.

Hydrate area 126 may suitably be subdivided as described for the carnallite area 112. In this area principally, magnesium sulfate pentahydrate and hexahydrates are recovered as crystals. By transferring the solution through successive areas, control of the process is permitted. Alternate trains may be provided to permit continuous production even while harvesting, in the same manner as described in connection with carnallite area 112. After the crystallization of magnesium sulfate hydrates, the remaining liquor is passed into bischofite area 109 through transfer means 131 for carrying out step 56.

Suitable means 127 is provided in hydrate area 126 for the removal of magnesium sulfate hydrate crystals. Means 127 may take the form of any conventional crystal-removing apparatus. When harvested, the magnesium sulfate hydrates are further processed to recover marketable products which may include $MgSO_4$, $K_2SO_4$ and $Na_2SO_4$.

In bischofite area 109, the remaining solution which is high in magnesium chloride is subjected to final solar evaporation to the terminal or ultimate brine density. A portion of this brine is recycled by transfer means 108 to precarnallite pans 107. The remaining brine may be further processed to recover magnesium chloride and other constituents.

Transfer means 132 may be employed to supplement transfer means 108 in transferring the bittern from bischofite area 109 to precarnallite area 107.

Since only a portion of bittern is recycled from bischofite area 109 to precarnallite area 107, the remainder is transferred to reserve area 133 from which it may be withdrawn as required for processing or for rejection from the system.

FIG. 9 is an illustrative material balance chart showing the amounts of the five components at each of the steps in the process in a typical operation. The balance was calculated from data which were collected from solar pans operated in the Sechura Desert in Bayovar, Peru.

The incoming brine has a density of 1.21. This concentration may be achieved naturally as in many inland brines existing throughout the world, by solar evaporation of sea water, or by other means. The Ramon brine in Bayovar, Peru, is typical of inland brines originally derived from sea water, although the composition of such inland brines may vary substantially at different locations in the world.

In the concentration of step 43 (see FIG. 5), halite is crystallized. As shown in FIG. 9, roughly 200 of the 289 parts of sodium are recovered in this step. Chloride is present in larger proportion than sodium in the feed brine, but nearly half of the chloride is removed as halite in step 43 as shown in column 4 of FIG. 9.

In step 46, carried out in precarnallite area 107 (FIG. 8), still more halite is removed, as shown in FIG. 9, so that by the time the liquor passes through carnallite pans 112 to carry out step 48, only 18 parts Na out of an initial 289 parts remain.

In step 48, a small amount of halite is crystallized along with a substantial amount of potassium as carnallite. As noted in column 1 of FIG. 9, about three-fourths of the potassium present in the system is removed in step 48 as carnallite. Most of the rest of the potassium is recovered as carnallite which crystallizes in hydrate pans 126 in step 52.

Step 52 also provides for crystallization of magnesium sulfate pentahydrate which permits removal of sulfate from the system.

In step 56, the liquor is concentrated to bittern. A portion of this bittern is recycled to maintain sulfate in solution and the rest is processed to remove bischofite. It will be noted from FIG. 9 that only a very small percentage of potassium is passed to the liquor reserve from which bischofite is recovered. As the brine at terminal density is evaporated the salts carnallite, kieserite, halite, and bischofite crystallize. By taking advantage of normal pan temperature changes bischofite may be separated from the other components through fractional crystallization, with recovery of K and $SO_4$ values by wet screening from the much coarser bischofite. For example, when 1,500 ml. of terminal brine at a temperature of 44° C. was cooled to 28° C. by standing overnight at ambient temperatures in Bayovar, Peru, the crystals which formed had the following particle sizes and analysis in percent:

| Mesh | K | Mg | Na | Cl | $SO_4$ | Grams |
|---|---|---|---|---|---|---|
| +6 | .05 | 10.65 | .52 | 31.1 | .98 | 99 |
| 6 x 14 | .03 | 10.78 | .34 | 31.31 | .91 | 65 |
| 14 x 48 | 7.26 | 9.15 | 2.05 | 33.47 | 4.01 | 6 |
| −48 | 6.94 | 3.55 | 3.90 | 30.07 | 9.71 | 6 |
| | | | | | | 176 |

Since the bischofite crystals are much larger, they may be separated from hydrate and carnallite crystals by screening to recover $MgCl_2$ from the brine system. The smaller crystals may be separated by more elaborate procedures or else be recycled for further recovery of potash and pentahydate values.

In addition, other separating means may be used to recover the coarse bischofite crystals from the smaller crystals. Thus, cycloning, hydro classification, and heavy media are suitable in the enrichment treatment to separate bischofite.

EXAMPLE I

This example illustrates the formation of quasi-stable carnallite. Brine from the Ramon area of Bayovar, Peru, specifically from a well known as CD12, was trucked to Bayovar at a rate averaging about 6,000 liters per day. This brine had a density of 1.21 and a composition corresponding to point 18 in FIGS. 1 and 2. This composition was:

| | K | Mg | Na | Cl | $SO_4$ | $H_2O$ |
|---|---|---|---|---|---|---|
| Percent | .52 | 2.30 | 6.60 | 16.31 | 1.40 | 72.87 |
| Mols/1,000 mols $H_2O$ | 1.6 | 23.4 | 35.4 | 56.8 | 3.6 | |
| Mol percent | 5.6 | 81.3 | | | 12.6 | |

Based on the published equilibria of FIG. 1, this brine should crystallize during the evaporation in the sequence of salts as follows: (1) halite, (2) halite-kainite, (3) halite-kainite-kieserite, (4) halite-carnallite-kieserite, and (5) halite-carnallite-kieserite-bischofite (invariant at constant temperature).

Calculation of distribution and yield would indicate by stage:

Potassium as: percent of Feed K
  Kainite ................................................... 58.6
  Carnallite ............................................... 30.6
  Terminal brine ........................................ 10.8

The Ramon brine was evaporated from a density of 1.21 to a density of 1.31. 6,640 pounds of brine at 1.31 was transferred to the first pan 116 in the carnallite finishing area 112.

12.4 percent of the water in the feed was evaporated in the solar pans from a density of 1.31 to a density of 1.34 crystallizing 42 percent of the K in the feed as a high quality mixture of carnallite and halite. Analysis of liquor and solids is as follows:

PERCENT

| | K | Mg | Na | Cl | $SO_4$ | $H_2O$ | |
|---|---|---|---|---|---|---|---|
| Liquor feed to carnallite area | 1.62 | 7.01 | .96 | 20.30 | 4.20 | 65.91 | |
| Liquor discharge | 1.12 | 7.61 | 1.05 | 21.30 | 4.77 | 64.15 | |
| Solids | 11.57 | 7.69 | 4.68 | 38.88 | 1.71 | 35.47 | |

| | | | Solids Composition | | | | Total |
|---|---|---|---|---|---|---|---|
| Carnallite | 11.55 | 7.16 | | 31.42 | | 31.88 | 82.01 |
| Halite | | | 4.67 | 7.21 | | | 11.88 |
| Hexahydrate | | .42 | | | 1.66 | 1.86 | 3.94 |
| Entrained liquor | .02 | .11 | .01 | .25 | .05 | 1.73 | 2.17 |
| Total | 11.57 | 7.69 | 4.68 | 38.88 | 1.71 | 35.47 | 100.00 |

As shown, and in contrast to published equilibria, Kainite did not form at all. However, yield of K as carnallite on untreated Ramon brine in the carnallite area of 42 percent of the K in the feed was improved upon by recycling bittern as shown in subsequent examples.

EXAMPLE II

This example illustrates the use of bittern recycled to improve the yield of carnallite and halite and the quality of the $MgSO_4$ hydrates. Ramon brine from Bayovar, Peru, was processed by solar evaporation from a density of 1.21 to a density of 1.31 depositing solely halite as in Example I. The run was commenced by mixing one part of brine at a density of 1.31 with one part by volume of bittern at terminal density. The feed brine had a composition in percentages of: K, 1.68; Mg, 7.02; Na, .77; Cl, 20.67; $SO_4$, 4.26; and $H_2O$, 65.60.

The bittern recycled had a composition in percentages of: K, .04; Mg, 9.25; Na, .52; Cl, 25.87; $SO_4$, 2.68; and $H_2O$, 61.64.

Upon mixing the feed with the bittern recycle, carnallite and halite crystals immediately began to form. After some of the halite and carnallite were deposited, the liquor was transferred to a different pan where halite and carnallite continued to be deposited. The following day, the liquor was transferred to a third pan, and on the third day it was transferred to a fourth pan where it remained for three days. The liquor was transferred through three further pans during the next week, until the concentration became such that $MgSO_4$ hydrates began to crystallize. Hydrate crystallization was continued for 18 days, at which time the liquor was transferred to the bischofite area. The run through the finishing area (carnallite and hydrate) was essentially complete in seventeen days. The division between the carnallite and hydrate areas was arbitrarily established as the point at which brine crystallizes solids containing more than 2 percent $SO_4$. At a recycle ratio by volume of 1.0, the 2 percent $SO_4$ was reached when the brine had a density in the range of 1.346 to 1.352. The brine may be moved to the hydrate area either above or below this range. If, however, the brine has a density below 1.346, then less recovery of K in the carnallite-halite mixture may be expected. On the other hand, if the brine is above 1,352, then contamination of the carnallite-halite mixture with $SO_4$ is greater. The hydrates formed in these examples included the series of $MgSO_4$ hydrates containing from 1 to 7 moles of water of crystallization. The most prominent hydrite solid phase is pentahydrate above a density of about 1.33. Below 1.33, hexahydrate is the most common hydrate phase. The density of the feed to hydrate area should be as high as practical in order to reject the maximum quantity of halite in the carnallite area without $SO_4$ contamination.

EXAMPLE III

This test was designed to determine the effect of bittern recycle addition in several stages. 10,152 pounds of Ramon brine at a density of 1.316 at 30.5° C. was mixed with 2,624 pounds of bittern at density 1.32 to 30.5° C. 36 percent of the K in the feed had "salted out" as high quality carnallite by the following morning. The brine the next morning, at a density of 1.318 and temperature of 32° C. was transferred to stage 2 and solar evaporated for two days. At that time, analysis showed that the solid phases formed during stage 2 contained small amounts of pentahydrate at a qualitative $SO_4$ more than 0.6 percent. The brine at a density of 1.324 at 26° C. was transferred to stage 3 and mixed with an additional 2,624 pounds of bittern recycle density 1.364 at 32° C. The brine was solar evaporated for three days. Brine at a density of 1.330 at 40.5° C. was transferred to stage 4 and the third portion of 2,624 pounds of bittern mixed in. The next day, the brine at density 1.348 at 29° C was transferred to stage 5 in the hydrite area and was evaporated for 14 days when a film of bischofite formed on the surface indicating virtual completion of the solar process. The terminal brine had a density of 1.368 at 29° C. The weight balance showed 102 percent K accountability and yield of 88 percent of the initial K as a mixture of carnallite and halite. The analysis in percent was:

|  | Carnallite Area | Hydrate area | Carnallite and Hydrate composite |
|---|---|---|---|
| KCl | 22.1 | 6.7 | 17.9 |
| $MgCl_2$ | 30.9 | 11.8 | 25.7 |
| $MgSO_4$ | .75 | 36.3 | 10.4 |
| NaCl | 8.0 | 8.4 | 8.1 |
| $CaSO_4$ | (¹) | (¹) | (¹) |
| Insoluble | (¹) | (¹) | (¹) |
| $H_2O$ | 38.25 | 36.8 | 37.9 |
|  | 100.00 | 100.00 | 100.00 |

¹ Trace.

Recycle of bittern entirely to the first pan, as in Example II, or incrementally, as in Example III, are both extremely effective. Significant improvement, however, was obtained in the $MgSO_4$ quality in the test of incremental recycle but this difference is considered a result of the difference in temperature of feed in each case to the hydrate area. For Example II, hydrate feed had a density of 1.347 and temperature of 33° C. at 6:00 p.m., while for Example III hydrate feed density was 1.348 and temperature 28° C. at 9:40 a.m. However, analysis indicates the solutions are practically identical.

|  | K | Mg | Na | Cl | $SO_4$ | $H_2O$ |
|---|---|---|---|---|---|---|
| Example II | .24 | 8.59 | .47 | 23.09 | 3.93 | 63.68 |
| Example III | .21 | 8.55 | .55 | 23.13 | 3.86 | 63.70 |

I conclude that since carnallite solubility is directly proportional to temperature, the 5° C. differential between the two brines caused the hydrate grade improvement in Example III, and that analysis where K is as low as indicated is simply insensitive to the minor change needed to bring about the grade improvement. Normal pan temperature effects may be used to advantage to improve results even more than shown in the comparison of Examples II and III.

EXAMPLE IV

A feed brine consisting of 6,553 liters of Zapayal brine density 1.218 at 28° C. began solar evaporation. Brine was transferred to stage 1 ten days later at a density 1.242 at 29° C. 1150 kg. of NaCl was harvested. In stage 1, brine at a density of 1.242 and at a depth of 10 cm. was mixed with 10 cm. depth of bittern recycle, density 1.276 at 37° C. On the following morning the synthetic brine at density 1.282 at 29° C. was transferred to stage 2. 445 kg. of NaCl formed in stage 1 by "salting out." In stage 2, an additional 2 cm. bittern was added. Six hours after the additional bittern was introduced, the brine was transferred to stage 3. 35 kg. of NaCl was formed by "salting out." In stage 3, brine density was 1.313 at 27.5° C., and was evaporated for one day forming 47 kg. NaCl. Brine was transferred to stage 4 at a density of 1.308 at 27° C. The brine was solar evaporated for six days to a density of 1.346 at 37° C. The brine was transferred to stage 5 and evaporated four more days. Brine was then moved into the hydrite area, stage 6.

In stages 1, 2 and 3 of this example, high quality halite crystallized, while stages 4 and 5 crystallized high quality carnallite-halite. Stage 6 was the hydrate stage. Total K accountability was 97.9 percent with actual recovery in the carnallite area as high quality mixture of carnallite halite of 49.7 percent.

Bittern recycle added before intercept with the leonite field (see FIGS. 1 and 2) efficiently prevented the normal formation of leonite and kainite. However, there was a slight contamination of the stage 3 halite with polyhalite ($MgSO_4 \cdot K_2SO_4 \cdot 2CaSO_4 \cdot 2H_2O$).

Where the losses of liquor in a batch test like the one described are not incurred, as in a steady state commercial operation, total halite recovery indicated from liquor analysis is 70.2 percent by evaporation and 21.3 percent by salting out, making a 91.5 percent recovery.

The present invention provides a simple, positive, and economical method and apparatus for separating the components in marine brine, without the necessity of adding expensive reagents which are not readily available. Potash magnesium sulfate, magnesium chloride and sodium chloride are each independently recovered without contaminating each other to any considerable extent.

The invention may be practiced with all brines, either synthetic or natural, which are marine or marine-derived and have either a similar initial composition or an analysis which may be adjusted by recycle to create a similar composition.

What is claimed is:
1. In a method of separating and recovering the components of brines containing sodium, potassium, magnesium, chloride and sulfate ions, the steps comprising:
   (a) evaporating water from said brine to crystallize out NaCl and separating a first liquor from the crystals of NaCl;
   (b) mixing a $MgCl_2$ solution with said first liquor;
   (c) evaporating water from said mixture whereby $KCl \cdot MgCl_2 \cdot 6H_2O$ is formed and crystallized out as a first potassium phase and leaving a second liquor retaining substantially all of the sulfate ions in solution;
   (d) separating the second liquor from the crystals of $KCl \cdot MgCl_2 \cdot 6H_2O$;
   (e) evaporating water from said second liquor to crystallize out magnesium sulfate hydrates and to leave a third liquor; and
   (f) separating the third liquor from the crystals of magnesium sulfate hydrates and recycling said third liquor as the source of said $MgCl_2$ solution for admixture with said first liquor.

2. In a method of separating and recovering the components of brines containing sodium, potassium, magnesium, calcium, chloride and sulfate ions, the steps comprising:
   (a) concentrating said brine to a density of about 1.12 to crystallize out calcium salts and separating a first liquor from said calcium salt crystals;
   (b) concentrating said first liquor to a density of about 1.21 to crystallize out NaCl and separating a second liquor from said crystals of NaCl;
   (c) mixing a solution containing $MgCl_2$ with said second liquor to form a synthetic brine;
   (d) concentrating said synthetic brine to a density of from about 1.31 to about 1.35 whereby
   $$KCl \cdot MgCl_2 \cdot 6H_2O$$

is formed and crystallized out as a first potassium phase and leaving a third liquor retaining substantially all of the sulfate ions in solution;
(e) separating the third liquor from the crystals of KCl·MgCl$_2$·6H$_2$O;
(f) concentrating said third liquor to a density above 1.35 to crystallize out magnesium sulfate hydrates and to leave a fourth liquor;
(g) separating said fourth liquor from the crystals of magnesium sulfate hydrates and recycling said fourth liquor as the source of said MgCl$_2$ solution for admixture with said second liquor.

3. In a method of separating and recovering potassium from brine containing sodium, potassium, magnesium, chloride and sulfate ions, the steps comprising:
(a) evaporating water from said brine to crystallize out NaCl and separating a first liquor from the crystals of NaCl,
(b) mixing a slurry containing bischofite with said first liquor to form a synthetic brine;
(c) evaporating water from said synthetic brine whereby carnallite is formed and crystallized out selectively as a first potassium phase and leaving a second liquor retaining substantially all of the sulfate ions in solution;
(d) separating the second liquor from the crystals of carnallite;
(e) evaporating water from second liquor to crystallize out magnesium sulfate and to leave a third liquor;
(f) separating the third liquor from the magnesium sulfate;
(g) evaporating water from the third liquor to form a brine bittern saturated with bischofite and recycling said bittern as the source of said bischofite slurry for admixture with said first liquor.

4. The method of claim 3, wherein water is evaporated from the brine bittern to crystallize out bischofite, the bischofite crystals are separated from the bittern, classified as to coarse and fine crystals, and the coarse crystals are added to a brine to form a slurry of bischofite crystals which are recycled for admixture with said first liquor.

5. In a method of recovering potassium from a brine containing sodium, magnesium, potassium, chloride and sulfate ions at atmospheric temperature, the steps comprising:
(a) adding a solution containing MgCl$_2$ to said brine;
(b) evaporating water from said mixture whereby carnallite is selectively formed and crystallized out while the sulfate ions are retained in solution through substantial supersaturation of the brine liquor with respect thereto;
(c) and recovering said carnallite crystals.

6. In a method as in claim 5, the step of adding to the brine a solution having a MgCl$_2$ to sulfate ratio above that of the feed brines, whereby carnallite is formed as the first potash phase.

7. In a method as in claim 5, the steps of adding bittern from evaporation of marine brine at a density of between 1.33 ad 1.37 to a feed brine from which substantial amounts of NaCl have been removed, which feed brine has a density of less than 1.32 at 35° C. and is just below potassium saturation.

8. In a method as in claim 5, the step of adding said MgCl$_2$ in the form of solid crystals of bischofite.

9. In a method as in claim 5, the step of adding said MgCl$_2$ in the form of a slurry of bischofite crystals in brine.

10. In a method according to claim 5, the step of recycling bittern from solar evaporation of marine brine as said solution containing magnesium chloride.

11. In a method according to claim 10, the step of recycling said bittern in proportion to said brine such that the mixture has between 0.5 and 8 mol percent potassium, between 53 and 93 mol percent magnesium, and between 6 and 28 mol percent sulfate.

12. In a method of separating and recovering carnallite from brines of marine origin which contain sodium, potassium, magnesium, chloride and sulfate ions, the steps comprising:
(a) mixing a first brine having a magnesium chloride concentration below about 67 mols per 1000 mols of water, said first brine having a magnesium chloride chloride concentration above about 90 mols per 1000 of water with a second brine having a magnesium to sulfate ratio below that of the second brine;
(b) removing a portion of the water from said mixture whereby carnallite is selectively formed and crystallized out as a first potassium phase while substantially all of the sulfate ions are retained in solution;

13. In a method as in claim 12, wherein said first brine has a magnesium chloride concentration below about 20 mols per 1000 mols of water.

14. In a method of separating and recovering the components of marine brine containing sodium, potassium, magnesium, calcium, chloride and sulfate ions, the steps comprising:
(a) concentrating said brine to crystallize out calcium salts and separating said calcium salts from a remaining liquor;
(b) concentrating the remaining liquor to crystallize out NaCl and separating said NaCl from a second remaining liquor;
(c) adding a recycle containing MgCl$_2$ to said second remaining liquor to form a synthetic brine which is saturated as to potassium ions and unsaturated as to potassium ions and unsaturated as to sulfate ions;
(d) concentrating said synthetic brine whereby KCl·MgCl·6H$_2$O is formed and preferentially crystallized out as a first potassium phase and leaving a third remaining liquor retaining substantially all of the sulfate ion in solution;
(e) separating said third remaining liquor from the crystals of KCl·MgCl·6H$_2$O;
(f) concentrating said third remaining liquor crystallize out MgSO$_4$ hydrates and to leave a fourth remaining liquor;
(g) separating said MgSO$_4$ hydrates from said fourth remaining liquor;
(h) concentrating said fourth remaining liquor to crystallize out MgCl·6H$_2$O and to leave an ultimate bittern;
(i) separating said MgCl$_2$·6H$_2$O from the ultimate bittern and recycling said bittern as the source of said MgCl$_2$ for admixture with said second remaining liquor.

15. In a method as in claim 14, the step of concentrating said second remaining liquor to a density less than 1.32 measured at 35° C. prior to adding said recycle.

16. In a method as in claim 15, wherein the density to which said second remaining liquor is concentrated is 1.31 at 35° C.

17. The method of claim 14, wherein KCl is recovered from said separated crystals of KCl$_2$·MgCl$_2$·6H$_2$O and the remaining products from the KCl recovery are recycled into the third remaining liquor.

18. In a method of separating and recovering the components of marine brine containing sodium, potassium, magnesium, chloride and sulfate ions, the steps comprising:
(a) solar evaporating said brine to crystallize out halite and to leave a first liquor;
(b) transferring said first liquor from said halite crystals and harvesting said halite crystals;
(c) adding a recycle containing MgCl$_2$ to said first liquor such that potassium and sulfate ions remain in solution;

(d) solar evaporating said modified first liquor to a density below 1.32 measured at 35° C. whereby halite is crystallized out and leaving a second liquor;

(e) transferring the second liquor into a solar pan at a depth of less than 50 cm.;

(f) solar evaporating said second liquor to crystallize out a mixture of carnallite and halite and to leave a third liquor;

(g) transferring said liquor through successive pans at a depth of less than 50 cm. and under solar evaporation to crystallize out repeatedly a mixture of carnallite and halite and to leave a fourth liquor while retaining substantially all of the sulfate ions in supersaturated solution in said fourth liquor;

(h) continuing said transfers until the crystal mixture contains a maximum of 2% sulfate content;

(i) separating said fourth liquor from said mixture of carnallite and halite crystals;

(j) solar evaporating said fourth liquor to crystallize out $MgSO_4$ hydrates having from 1 to 7 mols of water of crystallization and to leave a fifth liquor;

(k) separating said fifth liquor from said $MgSO_4$ crystals;

(l) solar evaporating said fifth liquor to crystallize out bischofite and to leave an ultimate bittern;

(m) separating the bischofite crystals from the ultimate bittern and recycling said bittern as the source of said $MgCl_2$ for admixture with said first liquor.

References Cited

UNITED STATES PATENTS

| | | | |
|---|---|---|---|
| 1,090,125 | 3/1914 | Graves et al. | 23—91 |
| 1,829,539 | 10/1931 | Prutton | 23—91 XR |
| 1,968,737 | 7/1934 | Borradaile | 23—91 XR |
| 2,108,783 | 2/1938 | Smith | 23—89 |
| 2,479,001 | 8/1949 | Burke et al. | 23—91 |
| 2,758,912 | 8/1956 | Dancy | 23—91 |
| 2,759,794 | 8/1956 | Fuchsman | 23—91 |
| 3,055,734 | 9/1962 | Pomykala | 23—89 |
| 3,099,528 | 7/1963 | Hadzeriga | 23—89 |
| 3,268,289 | 8/1966 | Macey | 23—89 |
| 3,342,548 | 9/1967 | Macey | 23—89 |

FOREIGN PATENTS 67,461  10/1960  India.

EDWARD STERN, Primary Examiner

U.S. Cl. X.R.

23—91, 122, 128

UNITED STATES PATENT OFFICE
CERTIFICATE OF CORRECTION

Patent No. 3,536,444    Dated October 27, 1970

Inventor(s) Alfred F. Nylander

It is certified that error appears in the above-identified patent and that said Letters Patent are hereby corrected as shown below:

Col. 1, line 37, "nad" should be -- and --; Col. 3, line 49, "than 86" should be -- than about 86 --; Col. 4, line 9, "on the" should be -- on to the --; Col. 4, line 52, "7" should be -- 27 --; Col. 4, line 72, "quasi-table" should be -- quasi-stable --; Col. 5, line 9, "which is the ultimate brine" should be -- which is recycled may be either a bittern, which is the ultimate brine --; Col. 5, line 30, "without" should be -- within --; Col. 9, line 22, "saturattion" should be -- saturation --; Col. 11, line 35, "R cycled" should be -- Recycled --; Col. 11, line 43, "hydrates" should be -- hydrate --; Col. 12, line 20, "hexahydrates" should be -- hexahydrate --; Col. 13, line 59, "81.3" should be -- 81.8 --; Col. 14, line 65, "1,352" should be -- 1.352 --; Col. 14, line 70, "hydrite" should be -- hydrate --; Col. 15, line 5, "to" should be -- at --; Col. 17, line 28 (Claim 3), "from second" should be -- from said second --; Col. 17, line 59 (Claim 7), "ad" should be -- and --; Col. 18, line 8 (Claim 12), "chloride" should be deleted (repetition); Col. 18, line 8 (Claim 12), "1,000" should be -- 1,000 mols --; Col. 18, lines 7 thru 10 (Claim 12) should read -- of water with a second brine having a magnesium chloride concentration above about 90 mols per 1000 mols of water, said first brine having a magnesium chloride to sulfate ratio below that of the second brine; --; Col. 18, between lines 14 & 15, (Claim 12), the following was omitted, -- (c) and recovering said carnallite crystals. --; Col. 18, line 31 (Claim 14), the following should be omitted (repetition), "potassium ions and unsaturated as to"; Col. 18, line 34 (Claim 14), "MgCl" should be -- $MgCl_2$ --; Col. 18, line 41 (Claim 14), "MgCl" should be -- $MgCl_2$ --; Col. 18, line 42 (Claim 14), "liquor crystallize" should be --, liquor to crystallize --; and Col. 18, line 48 (Claim 14), "MgCl" should be -- $MgCl_2$ --.

Signed and sealed this 8th day of June 1971.

(SEAL)
Attest:

EDWARD M. FLETCHER, JR.
Attesting Officer

WILLIAM E. SCHUYLER, JR.
Commissioner of Patents